Nov. 15, 1927.  H. R. BENSON  1,649,655

CARGO HOOK

Filed Feb. 26, 1927

INVENTOR
Henry R. Benson
BY
Frank Warren
ATTORNEY

Patented Nov. 15, 1927.

1,649,655

UNITED STATES PATENT OFFICE.

HENRY R. BENSON, OF SEATTLE, WASHINGTON, ASSIGNOR TO STANDARD SAFETY APPLIANCE COMPANY, OF EVERETT, WASHINGTON.

CARGO HOOK.

Application filed February 26, 1927. Serial No. 171,138.

My invention relates to improvements in hooks and is in the nature of an improvement on the hook disclosed in my prior Patent No. 1,446,781 issued February 27, 1923.

The object of my present invention is to provide a hook of this nature that is adapted to engage with a non-flexible ring or link and hold the same in such a manner that said ring or link will not become accidentally disengaged therefrom.

A further object is to provide a hook of this nature of one piece integral construction that is free from latches and other movable parts.

A more specific object is to provide a hook of this nature in which the point of the hook is located midway between, and relatively close to two guard members or wings and is arranged so that a ring or link can only be inserted into, or removed from the hook by turning it at an angle approaching a plane parallel with the plane of the hook.

Other and more specific objects will be apparent from the following description taken in connection with the accompanying drawings.

In the drawings, Figure 1 is a view in side elevation of a hook constructed in accordance with my invention, a fragment of a ring being shown as engaged therein.

Figure 1:
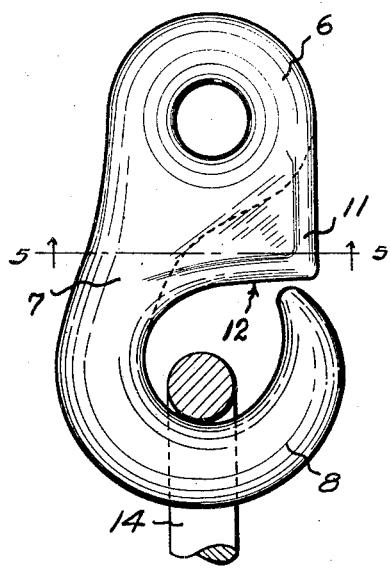
Figure 2:
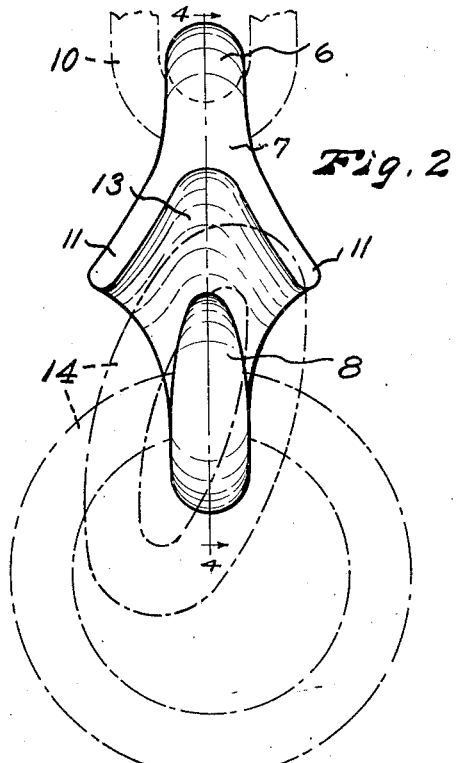
Fig. 2 is a front elevation of the same showing by broken lines, a position through which a ring may be passed in inserting it into the hook and also showing, by broken lines, the normal operative position of the ring in the hook.
Figure 3:
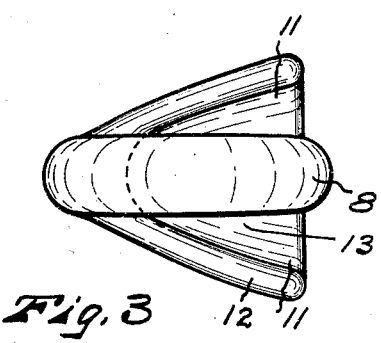
Fig. 3 is an end view of the hook.
Figure 5:
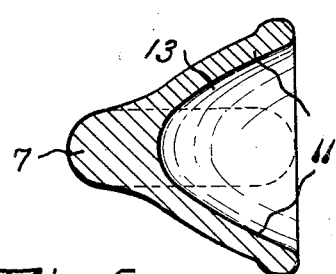
Figure 4:
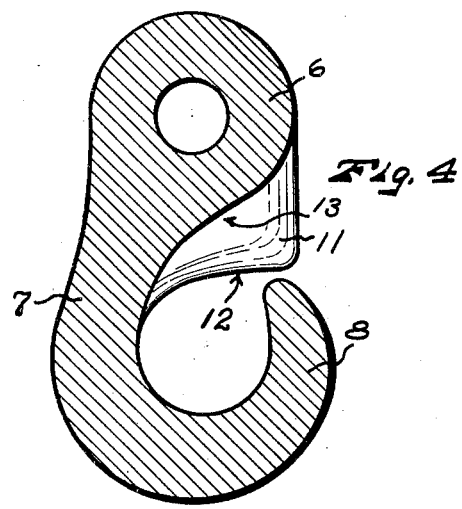

Figs. 4 and 5 are sectional views on broken lines 4—4 and 5—5 respectively of Figs. 2 and 1.

Referring to the drawings, throughout which like reference numerals designate like parts, I provide a hook, having an eye 6, a shank portion 7 and a curved hook portion 8, all formed in a manner common to hooks. The eye 6 has a hole for the reception of a link or cable 10 to which the hook may be attached.

Integral with the shank 7 and extending forwardly therefrom in outwardly flaring relation are two symmetrically arranged guard wings 11 each having a substantially straight shoulder or edge 12 directed toward the hook portion, said guard wings 11 leaving therebetween, a hollowed out portion 13 through which a ring 14 or similar device may be passed to engage the same with or disengage the same from the hook. The point of the hook 8 does not project between the guard wings 11 but preferably terminates just short of a transverse plane passing through the two shoulders 12.

To engage the ring 14 within the hook said ring is first turned into a plane approaching parallelism with the plane of the hook, thence it is inserted at one side between one of the guard wings 11 and the point of the hook, see oblong dotted line position Fig. 2, thence it is passed around the front of the hook and between said point and the other guard wing whereupon said ring is free to assume the fully engaged position shown by circular broken lines in Fig. 2. When thus engaged it becomes substantially impossible to accidentally disengage the ring from the hook and said ring can only be disengaged by taking hold of the same and turning it back into a plane that approaches parallelism with the plane of the hook and then passing the ring out around the point of the hook.

The ring is relatively easy to engage with or disengage from the hook manually but will not become accidentally disengaged from the hook irrespective of the slackness between said ring and the hook.

The outer edges of the guard lips 11 project beyond the point of the hook thereby preventing the point of the hook from catching on objects over which it may be dragged.

The foregoing description and accompanying drawings clearly disclose a preferred embodiment of my invention, but it will be understood that this disclosure is merely illustrative and that changes in the same may be resorted to within the scope and spirit of the following claims.

What I claim is:—

1. A hook of the class described, embodying a hook portion, a shank above said hook portion two spaced apart guard wings projecting forwardly from said shank, said guard wings affording shoulders on the sides adjacent said hook portion, the point of said hook being disposed in a plane substantially mid way between said guard wings and being directed toward said guard wings, the outer edges of said guard wings projecting outwardly beyond the point of said hook and said hook point terminating just short of the plane that passes through said shoulders.

2. A hook of the class described, embodying a hook portion, a shank connected with said hook portion, and two guard wings extending outwardly in divergent relation from said shank and leaving a recess therebetween the outer edges of said guard wings being substantially straight and the bottom edges of said guard wings affording shoulders that face the open portion of said hook portion, the point of said hook being directed toward the recess between said guard wings said point terminating short of the common plane of said shoulders and being inside of the plane of said straight outer edges.

In witness whereof, I hereunto subscribe my name this 10th day of February, A. D. 1927.

HENRY R. BENSON.